United States Patent
Jung et al.

(10) Patent No.: US 9,269,373 B2
(45) Date of Patent: *Feb. 23, 2016

(54) APPARATUS AND METHOD FOR PROVIDING AUGMENTED REALITY SERVICE USING SOUND

(71) Applicant: Samsung Electronics Co., Ltd., Gyeonggi-do (KR)

(72) Inventors: Hee-Won Jung, Gyeonggi-do (KR); Jun-Ho Koh, Gyeonggi-do (KR); Dong-Wook Kwon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,607

(22) Filed: Jun. 9, 2014

(65) Prior Publication Data

US 2014/0358550 A1 Dec. 4, 2014

Related U.S. Application Data

(63) Continuation of application No. 13/189,042, filed on Jul. 22, 2011, now Pat. No. 8,749,584.

(30) Foreign Application Priority Data

Jul. 22, 2010 (KR) .................. 10-2010-0070994

(51) Int. Cl.
| | |
|---|---|
| *G10L 21/10* | (2013.01) |
| *H04W 4/04* | (2009.01) |
| *H04L 29/08* | (2006.01) |
| *H04L 29/06* | (2006.01) |
| *G10L 15/26* | (2006.01) |

(Continued)

(52) U.S. Cl.
CPC .............. *G10L 21/10* (2013.01); *G10L 15/26* (2013.01); *G10L 25/69* (2013.01); *H04L 67/04* (2013.01); *H04L 67/18* (2013.01); *H04L 67/20* (2013.01); *H04L 67/38* (2013.01); *H04W 4/04* (2013.01); *H04W 4/043* (2013.01); *H04W 4/20* (2013.01)

(58) Field of Classification Search
None
See application file for complete search history.

(56) References Cited

U.S. PATENT DOCUMENTS

| 5,513,129 A | 4/1996 | Bolas et al. |
| 6,064,335 A | 5/2000 | Eschenbach |

(Continued)

FOREIGN PATENT DOCUMENTS

| CN | 1609993 | 4/2005 |
| CN | 101444065 | 5/2009 |

(Continued)

OTHER PUBLICATIONS

Korean Office Action dated Nov. 24, 2015 issued in counterpart application No. 10-2010-0070994, 7 pages.

*Primary Examiner* — Maurice L McDowell, Jr.
(74) *Attorney, Agent, or Firm* — The Farrell Law Firm, P.C.

(57) ABSTRACT

A method and an apparatus are provided for providing additional information service in a mobile communication terminal. A microphone receives a sound signal including an audible frequency band and an inaudible frequency band. Additional information related to the service is detected in the inaudible frequency band included in the sound signal. The detected additional information is extracted from the sound signal. Data for providing the service is acquired based on the extracted additional information. A service screen is displayed based on the acquired data.

16 Claims, 3 Drawing Sheets

(51) Int. Cl.
  *G10L 25/69* (2013.01)
  *H04W 4/20* (2009.01)

(56) References Cited

U.S. PATENT DOCUMENTS

| | | | |
|---|---|---|---|
| 8,749,584 B2 * | 6/2014 | Jung et al. | 345/633 |
| 2002/0161741 A1 | 10/2002 | Wang et al. | |
| 2005/0053362 A1 | 3/2005 | Manish | |
| 2006/0244565 A1 | 11/2006 | Friedrich et al. | |
| 2007/0050360 A1 | 3/2007 | Hull et al. | |
| 2007/0052997 A1 | 3/2007 | Hull et al. | |
| 2007/0096909 A1 | 5/2007 | Lally | |
| 2007/0247360 A1 | 10/2007 | Hsu | |
| 2009/0122992 A1 | 5/2009 | Kordon et al. | |
| 2010/0027837 A1 | 2/2010 | Levy et al. | |

FOREIGN PATENT DOCUMENTS

| | | | |
|---|---|---|---|
| DE | 199 51 546 | 5/2001 | |
| DE | 20 2005 016 846 | 3/2006 | |
| KR | 1020050078136 | 8/2005 | |
| KR | 10-0964096 | 6/2010 | |
| WO | WO 2010/048458 | 4/2010 | |
| WO | WO 2010048458 A2 * | 4/2010 | H04H 20/31 |

* cited by examiner

APPARATUS AND METHOD FOR PROVIDING AUGMENTED REALITY SERVICE USING SOUND

PRIORITY

This application is a Continuation Application of U.S. Pat. No. 8,749,584, issued on Jun. 10, 2014, which claims priority under 35 U.S.C. §119(a) to a Patent Application filed in the Korean Intellectual Property Office on Jul. 22, 2010 and assigned Serial No. 10-2010-0070994, the entire disclosures of which are incorporated herein by reference.

BACKGROUND OF THE INVENTION

1. Field of the Invention

The present invention relates generally to a mobile communication terminal, and, more particularly, to an apparatus and method for providing an augmented reality service using a sound in a mobile communication terminal.

2. Description of the Related Art

At a time of growing expansion of various services and additional functions for mobile communication terminals, various service systems providing various types of information to users have been developed. For example, recently introduced systems can provide basic position information of a mobile communication terminal when its user desires to know his current position requests his position information, i.e., information relating to the current position of the mobile communication terminal, using the mobile communication terminal that he carries with him.

One of the conventional techniques for providing such position information in the augmented reality field may detect a position of a user with a Global Positioning System (GPS) and a gyroscope, and provide a real image merged with its additional information to the user on a see-through Head-Mounted Display (HMD). This is the latest technique that can provide more useful information by mixing the real world with the cyber world created by a computer, for the visual representation and information provision impossible in the real world. This technique is widely known as an Augmented Reality (AR) technique, which can be used, for example, to provide a variety of information, including information about nearby attractions, to tourism travelers.

As described above, the conventional AR technique may provide additional information associated with a real image in a current position. However, the additional information in the current position may not be provided when the real image cannot be acquired for some reason. Thus, if it would be possible to provide an AR service, even in places where real images cannot be acquired or their features cannot be detected, its utilization may be enhanced.

SUMMARY OF THE INVENTION

An aspect of the present invention is to substantially solve at least the above problems and/or disadvantages and to provide at least the advantages below. Accordingly, an aspect of the present invention is to provide an apparatus and method for providing an Augmented Reality (AR) service even in a location in which a real image cannot be acquired.

Another aspect of the present invention is to provide an apparatus and method for providing an AR service using a sound instead of a real image.

And yet another aspect of the present invention is to provide an apparatus and method for providing AR-based additional information.

According to one aspect of the present invention, a method is provided for providing additional information service in a mobile communication terminal. A microphone receives a sound signal including an audible frequency band and an inaudible frequency band. Additional information related to the service is detected in the inaudible frequency band included in the sound signal. The detected additional information is extracted from the sound signal. Data for providing the service is acquired based on the extracted additional information. A service screen is displayed based on the acquired data.

According to another aspect of the present invention, an apparatus is provided for providing additional information service. The apparatus includes a microphone for receiving a sound signal including an audible frequency band and an inaudible frequency band. The apparatus also includes a controller for detecting the additional information related to the service in the inaudible frequency band included in the sound signal, extracting the detected additional information from the sound signal received through the microphone, acquiring data for providing the service based on the extracted additional information, and configuring a service screen based on the acquired data. The apparatus further includes a display unit for displaying the service screen.

BRIEF DESCRIPTION OF THE DRAWINGS

The above and other aspects, features and advantages of the present invention will become more apparent from the following detailed description when taken in conjunction with the accompanying drawing in which.

DETAILED DESCRIPTION OF EMBODIMENTS OF THE PRESENT INVENTION

Embodiments of the present invention will be described herein below referring to the accompanying drawings. Like reference numbers and symbols are used to refer to like elements through at the drawings. In the following description, well-known functions or constructions are not described in detail since they would obscure the invention with unnecessary detail.

An apparatus and method for providing an Augmented Reality (AR) service using sound are described herein. In order to accomplish this, the present invention includes receiving a sound signal if a function of providing the AR service in a mobile communication terminal is initiated by a user, analyzing the received sound signal, determining whether the sound signal is carrying additional information, extracting the additional information if the additional information is carried on the sound signal, acquiring data associated with the extracted additional information, and providing the AR service using the acquired data. Accordingly, the present invention can not only provide various types of additional information in the current position but also the AR service without the limitation of a location.

A system configuration for providing an AR service according to an embodiment of the present invention will now be described referring to FIG. 1.

Figure 1:
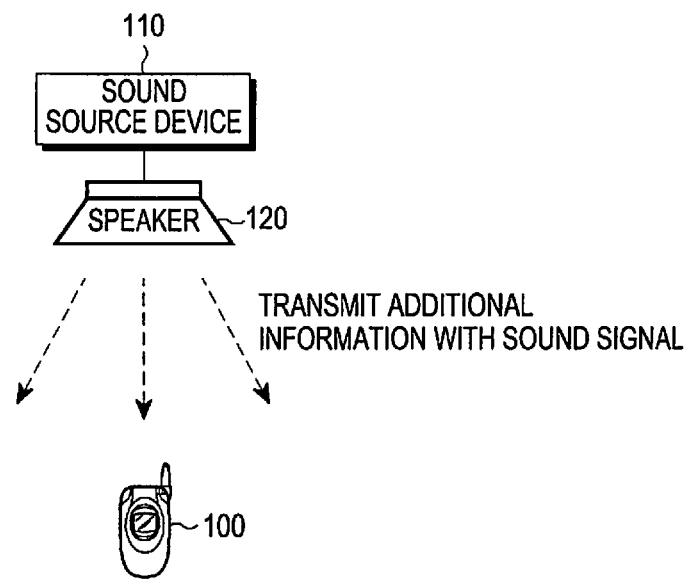
FIG. 1 is a diagram illustrating a configuration of a system for providing an AR service according to an embodiment of the present invention.

Referring to FIG. 1, the system for providing an AR service may include a sound source device 110 for providing a sound signal, and a mobile communication terminal 100 for receiving the sound signal.

The sound source device 110 may insert additional information into a sound signal according to a preset encoding scheme and transmit the sound signal. The sound source device 110 may broadcast through a speaker 120 the sound signal on which the additional information is carried. The sound source device 110 may be any device installed in a predetermined location, such as a subway station and a building. The sound signal may be a signal in an audible frequency band that a user can hear, and the additional information carried on the sound signal may be a non-sound signal in an inaudible frequency band that the user cannot hear so that the additional information is not heard by a user as noise. Accordingly, even if the additional information is carried on the sound signal, the user may not recognize any difference from a normal sound when the user hears a sound corresponding to the sound signal.

The mobile communication terminal 100 may start receiving the sound signal through a microphone when an AR service function is activated by the user. The mobile communication terminal 100 may determine whether additional information is carried on the sound signal, and if additional information is carried on the sound signal, the mobile communication terminal 100 may decode and extract the additional information carried on the sound signal. After extracting the additional information by decoding, the mobile communication terminal 100 may search for data associated with the additional information by comparing the additional information with information stored in a its database. Thereafter, the mobile communication terminal 100 may configure an AR service screen based on the searched data and display the screen. The mobile communication terminal 100 may output voice through its speaker to provide the AR service using the searched data.

Instead, the mobile communication terminal 100 may transmit the additional information extracted from the sound signal to a server (not shown), receive AR data corresponding to the additional information from the server, and configure an AR service screen using the AR data.

The data associated with the additional information may include information in a current position, such as associated images, a map, and local area information in the current position, and if the sound signal corresponds to music, the data associated with the additional information may include information associated with music. As described above, the additional information may be associated information in a current position where the sound signal is received, or additional information associated with a sound resource. On the other hand, the mobile communication terminal 100 may search for data associated with the additional information in using a database of an external server to provide information.

Figure 2:
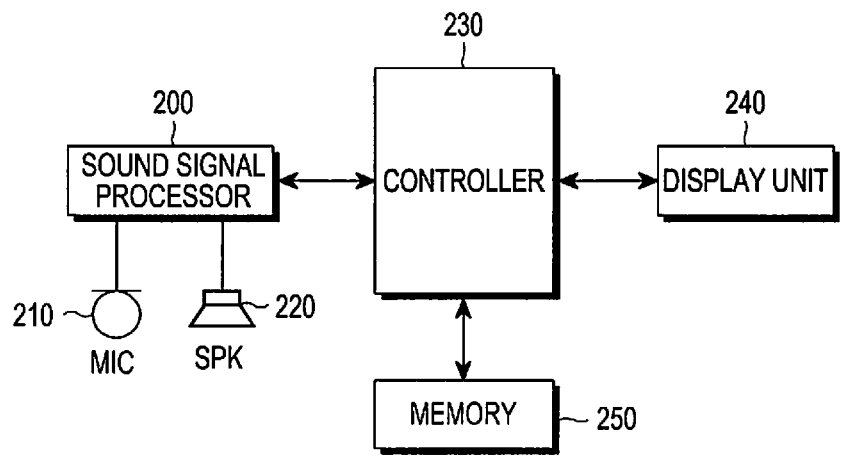
FIG. 2 is a block diagram of a mobile communication terminal for providing an AR service according to an embodiment of the present invention.

Operations and components of the mobile communication terminal 100 in the above-described system will now be described in detail referring to FIG. 2. In FIG. 2, the mobile communication terminal 100 may include a sound signal processor 200, a MICrophone (MIC) 210, a SPeaKer (SPK) 220, a controller 230, a display unit 240, and a memory 250. The mobile communication terminal 100 may further include a camera (not shown) for capturing a real image to provide the AR service in which additional information is added to the real image by using the additional information carried on a sound signal, and a communication unit (not shown) for transmitting the additional information extracted from the sound signal to an external server and receiving AR data corresponding to the transmitted additional information from the external server.

The sound signal processor 200 may receive a sound signal through the microphone 210, amplify the sound signal, and deliver the amplified sound signal to the controller 230. The microphone 210 may be activated to receive a sound signal when the user initiates the AR service function. The sound signal processor 200 may be connected to the speaker 220 so that a sound signal for the AR service output from the controller 230 is output to the outside.

The display unit 240 may generally display operation states and a plurality of pieces of information of the mobile communication terminal 100 under control of the controller 230. When the user sets or activates a necessary function, the display unit 240 may allow the user to recognize a set or activated state under control of the controller 230. The display unit 240 may display an AR service screen. As such, the display unit 240 may display data associated with additional information in a location at which the user is located, using graphic technology. For example, the user may view an image in a current position, which dynamically varies according to additional information carried on a received sound signal, together with data associated with the additional information, and if the sound signal corresponds to music, the user may view detailed information regarding the music.

The image in the current position may be an image included in the additional information or a real image, which was captured by the camera. If the image is the real image captured by the camera, the mobile communication terminal 100 may determine the current position and current bearing using a GPS and a gyroscope, and display information regarding surroundings based on the additional information (e.g., menu information of a restaurant) carried on a sound signal together with the real image.

The memory 250 may include Read Only Memory (ROM) and Random Access Memory (RAM) for storing a plurality of programs and data. The memory 250 may store data associated with additional information extracted from a sound signal. In other words, the memory 250 may include a database for storing data for providing the AR service.

The controller 230 may control the overall operation of the mobile communication terminal 100. According to an embodiment of the present invention, the controller 230 may determine whether additional information carried on a sound signal is received, and search the database for data corresponding to the additional information. Then, the controller 230 may configure an AR service screen based on the searched data, and output the configured AR service screen. Features may be inserted into the sound signal to make it possible to identify a position of the additional information in the sound signal. The features may be inserted in the form of specific codes or blanks. Accordingly, the controller 230 may detect the features inserted in the sound signal and extract the additional information between the detected features.

The additional information may have the following formats according to the present invention. The additional information may be metadata or have a link information format used to search the database for the position of associated data. If the additional information is in a metadata format, the controller 230 may provide the AR service with only the metadata and output detailed information by searching the database for content associated with the metadata. As described above, the metadata may be used to provide various types of information with respect to a received sound signal in connection to the database. For example, upon receipt of a sound signal on which various kinds of information associated with music as additional information, such as a genre, lyrics, and sale information, are carried, the controller 230 may obtain information useful to provide the AR service by analyzing the sound signal.

A process of providing the AR service will now be described referring to FIG. 3. The present invention may include extracting additional information from a sound signal 300 on which the additional information is carried, searching for data 320 associated with the extracted additional information from a database 310, and providing the AR service based on the searched data.

Figure 3:
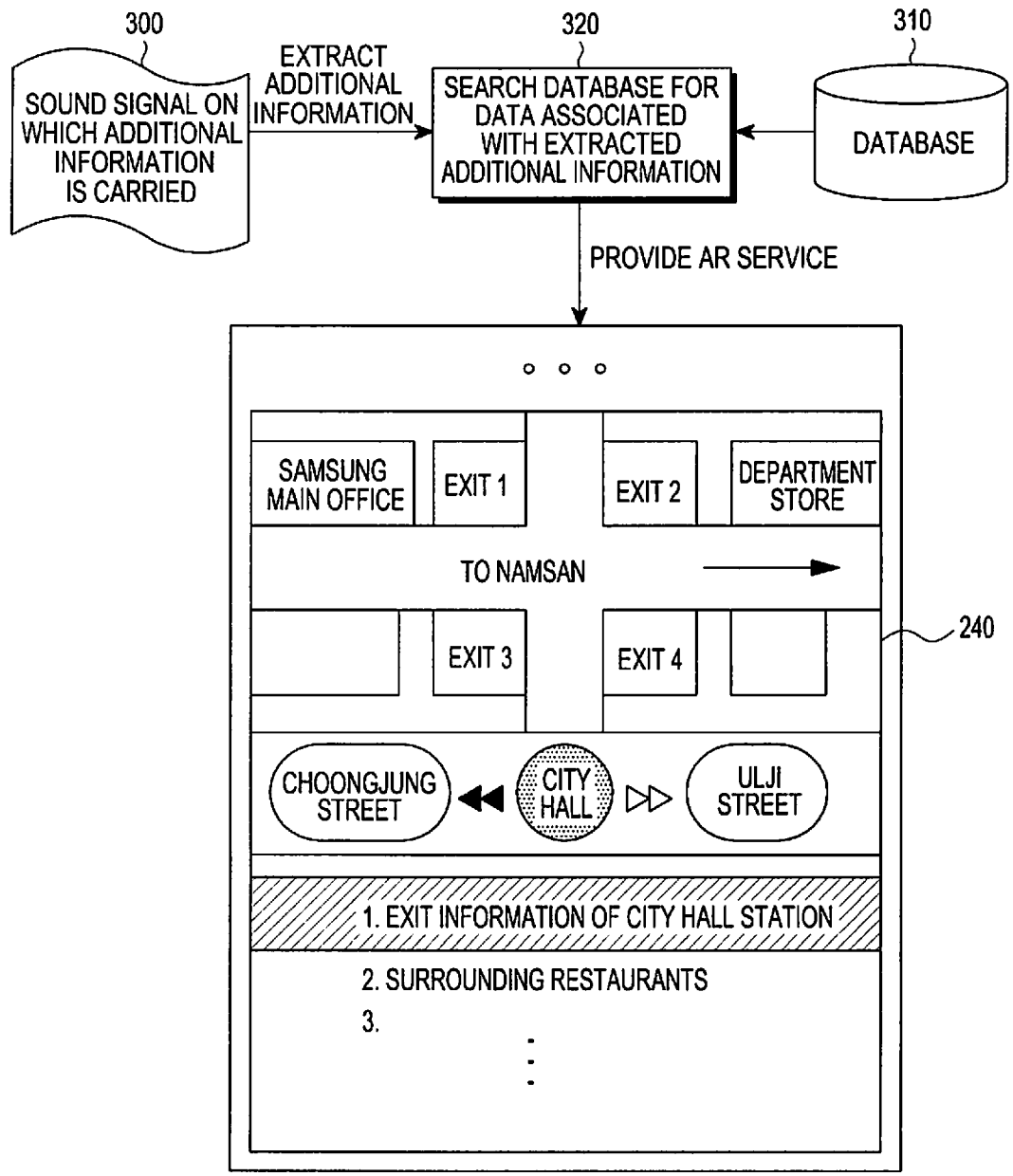
FIG. 3 is a diagram showing an example of an AR service according to an embodiment of the present invention.

An AR service screen made by the above-described process is provided to a user as shown in FIG. 3. Referring to FIG. 3, an AR service screen may be provided on the display unit 240 when the mobile communication terminal receives a subway announcement while it user is in a subway train.

For example, when the user wants to receive the AR service in a current position while hearing the subway announcement, the user may activate the AR service function of the mobile communication terminal 100. In that case, the mobile communication terminal 100 may start receiving the subway announcement through the microphone 210. In accordance with an embodiment of the present invention, the subway announcement corresponding to a sound signal may be an announcement on which additional information is carried. Thus, when the user receives such subway announcement on which additional information is carried, the mobile communication terminal 100 may display various kinds of information, such as exit information and surrounding restaurant information, together with an associated image in the current position.

Although in FIG. 3, the exit information is added to the associated image in the current position when the exit information is selected, restaurant location information may be added to the associated image when the surrounding restaurant information is selected. That is, various changes may be made in an AR service screen. As described above, the content of a screen for the AR service may be provided in various forms.

Although an AR service relating to public transportation, such as a subway train, is shown in FIG. 3, this is a mere example and the subject matter of the present invention are not limited thereto. For example, when a user desires to obtain further information regarding music heard while walking on the road, the mobile communication terminal 100 may acquire additional information about the music, and display data associated with the music. Similarly, the mobile communication terminal 100 may receive a sound source from a music vending machine and display additional information about the sound source to the user. Even though the user does not acquire entire sound source associated with the full music, the user may sufficiently obtain desired additional information with only a part of the sound source. Additionally, according to an embodiment of the present invention, the mobile communication terminal 100 may provide detailed information about a product to the user by merely receiving an announcement in a specific location, e.g., a store. As described above, additional information may be carried on various sound signals depending on selections made by service providers.

Figure 4:
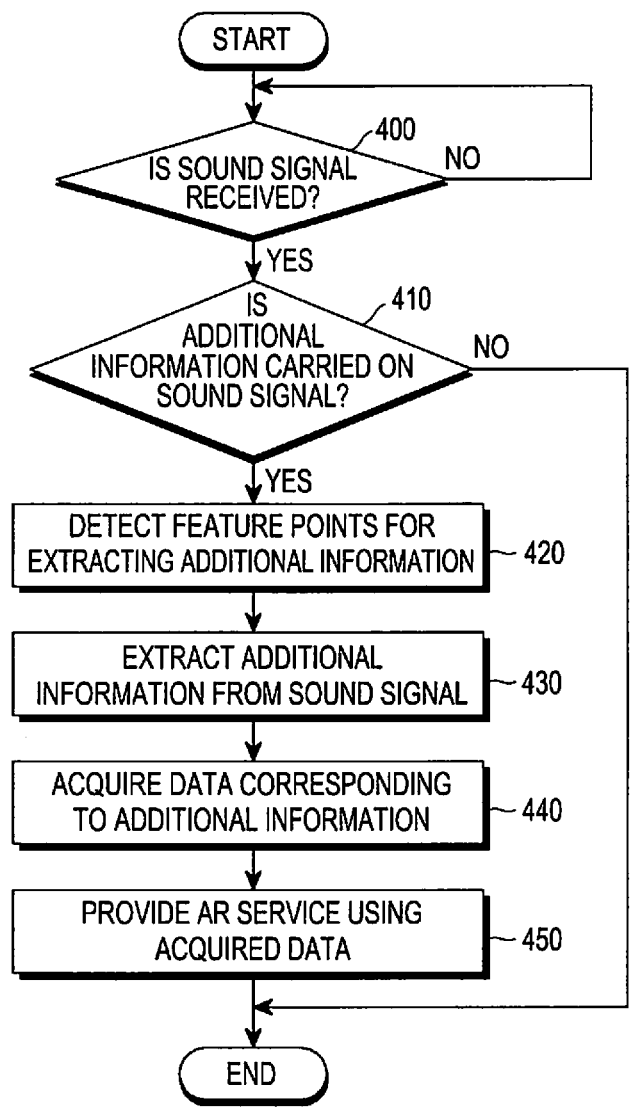
FIG. 4 is a flowchart illustrating a method of providing an AR service according to an embodiment of the present invention.

FIG. 4 is a flowchart illustrating a method of providing an AR service using a sound signal in the mobile communication terminal 100, according to an embodiment of the present invention. Although a method of extracting additional information by searching for features will be illustrated in the following description, the method of extracting additional information according to an embodiment of the present invention is not limited thereto.

Referring to FIG. 4, upon starting the AR service function, the mobile communication terminal 100 receives a sound signal through microphone 210 in step 400. In step 410, the mobile communication terminal 100 determines whether the sound signal is carrying additional information. If the sound signal is carrying additional information, the mobile communication terminal 100 detects features for extracting the additional information from the sound signal by decoding the sound signal according to a preset decoding scheme, in step 420. The detected features may be used to identify a boundary of the sound signal on which the additional information is carried. Accordingly, in step 430, the mobile communication terminal 100 extracts the additional information from the sound signal based on the detected features. In step 440, the mobile communication terminal 100 searches the database for data corresponding to the extracted additional information and acquires the searched data. In step 450, the mobile communication terminal 100 provides the AR service based on the acquired data.

As described above, the additional information carried on a sound signal enables the content associated with the sound signal to be output. Accordingly, a user may receive various kinds of information associated with a sound heard in a current position in various forms, such as images, graphics, and voice, in real-time.

As apparent from the foregoing description, the present invention may provide AR-based additional information using a sound instead of a real image, making it possible to provide various kinds of additional information even in a location, such as a subway train and a building, where no specific features may be detected, or real images may not be obtained because of the difficulty in taking a photograph. Additionally, the present invention may extract additional information from a sound received in a current position, thereby providing a map and tourist information in the current position and contributing to an expected increase in use of various additional services.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for providing additional information service in a mobile communication terminal, the method comprising:
 receiving, through a microphone, a sound signal including an audible frequency band and an inaudible frequency band;
 detecting additional information related to the service in the inaudible frequency band included in the sound signal;
 extracting the detected additional information from the sound signal;
 acquiring data for providing the service based on the extracted additional information; and
 displaying a service screen based on the acquired data.

2. The method of claim 1, wherein the extracting of the detected additional information from the sound signal comprises:
 decoding the sound signal according to a preset decoding scheme; and
 extracting the detected additional information from the decoded sound signal.

3. The method of claim 1, wherein the acquired data includes at least one of an associated image, a map, and surrounding information in a position where the sound signal is received.

4. The method of claim 1, wherein the acquired data includes music-associated information.

5. The method of claim 1, wherein acquiring the data for providing the service comprises searching a database for data associated with the extracted additional information.

6. The method of claim 1, wherein the acquiring of the data for providing the service comprises:
transmitting the extracted additional information to a server; and
receiving, from the server, data for configuring the service screen corresponding to the transmitted additional information.

7. The method of claim 1, wherein the additional information associated with the service includes a non-sound signal.

8. The method of claim 1, wherein the receiving of the sound signal comprises activating the microphone when additional information service function is activated by a user.

9. An apparatus for providing additional information service, the apparatus comprising:
a microphone for receiving a sound signal including an audible frequency band and an inaudible frequency band;
a controller for detecting the additional information related to the service in the inaudible frequency band included in the sound signal, extracting the detected additional information from the sound signal received through the microphone, acquiring data for providing the service based on the extracted additional information, and configuring an service screen based on the acquired data; and
a display unit for displaying the service screen.

10. The apparatus of claim 9, wherein the controller decodes the sound signal carrying the additional information, according to a preset decoding scheme and extracts the detected additional information from the decoded sound signal.

11. The apparatus of claim 9, wherein the acquired data includes at least one of an associated image, a map, and surrounding information in a position where the sound signal is received.

12. The apparatus of claim 9, wherein the acquired data includes music-associated information.

13. The apparatus of claim 9, further comprising:
a database for storing the data for providing the service.

14. The apparatus of claim 9, wherein the controller transmits the extracted additional information to a server, receives data corresponding to the transmitted additional information from the server, and configures the service screen based on the received data.

15. The apparatus of claim 9, wherein the additional information associated with the service includes a non-sound signal.

16. The apparatus of claim 9, wherein the controller activates the microphone when a user activates additional information service function and receives the sound signal through the microphone.

* * * * *